(12) United States Patent
Miyazaki

(10) Patent No.: US 8,516,472 B2
(45) Date of Patent: Aug. 20, 2013

(54) INFORMATION PROCESSING APPARATUS FOR EFFICIENTLY INFORMING INFORMATION ASSOCIATED WITH UPDATE DETAILS OF SOFTWARE AND CONTROL METHOD THEREOF

(75) Inventor: Shigeyuki Miyazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 286 days.

(21) Appl. No.: 12/832,479

(22) Filed: Jul. 8, 2010

(65) Prior Publication Data
US 2011/0023021 A1 Jan. 27, 2011

(30) Foreign Application Priority Data
Jul. 27, 2009 (JP) ................................ 2009-174741

(51) Int. Cl.
*G06F 9/44* (2006.01)
(52) U.S. Cl.
USPC ........................... 717/168; 717/169; 717/170
(58) Field of Classification Search
None
See application file for complete search history.

(56) References Cited

U.S. PATENT DOCUMENTS

| | | | | |
|---|---|---|---|---|
| 5,903,897 A * | 5/1999 | Carrier et al. | ................. | 717/170 |
| 6,610,103 B2 * | 8/2003 | Ehrman et al. | ................ | 715/256 |
| 7,437,722 B2 * | 10/2008 | Poole | ........................... | 717/170 |
| 7,536,684 B2 * | 5/2009 | Patrizio et al. | ................ | 717/170 |
| 7,552,430 B2 * | 6/2009 | Napier et al. | ................ | 717/169 |
| 8,234,248 B2 * | 7/2012 | Karimisetty et al. | ......... | 707/639 |
| 8,255,893 B2 * | 8/2012 | Savva | .......................... | 717/168 |
| 8,307,355 B2 * | 11/2012 | Capomassi et al. | ........... | 717/170 |
| 2002/0174422 A1 * | 11/2002 | Kelley et al. | ................. | 717/169 |
| 2004/0073900 A1 * | 4/2004 | Scott | ............................. | 717/170 |
| 2005/0149920 A1 * | 7/2005 | Patrizi et al. | .................. | 717/168 |
| 2007/0226730 A1 * | 9/2007 | Coyle et al. | ................... | 717/170 |
| 2008/0077848 A1 * | 3/2008 | Roberts | ......................... | 715/229 |
| 2009/0064123 A1 * | 3/2009 | Ramesh et al. | ............... | 717/168 |
| 2010/0131939 A1 * | 5/2010 | Hieb et al. | ..................... | 717/169 |

FOREIGN PATENT DOCUMENTS

| | | |
|---|---|---|
| JP | 2008-165418 | 7/2008 |
| JP | 2008-165418 A | 7/2008 |

OTHER PUBLICATIONS

Andrew Forward and Timothy Lethbridge, The Relevance of Software Documentation, Tools and Technologies: A Survey, [Online] Nov. 8-9, 2002, [Retrieved from the Internet on Jan. 11, 2013], <http://delivery.acm.org/10.1145/590000/585065/p26-forward.pdf> pp. 26-33.*

Ellis Horowitz and Ronald Williamson, SODOS: A Software Documentation Supoort Enviroemnt—Its Definition, [Online] Aug. 1986, [Retrieved from the Internet on Jan. 11, 2013] <http://ieeexplore.ieee.org/stamp/stamp.jsp?tp=&arnumber=6312987> pp. 849-859.*

Miki Magyar, Automating Software Documentation: A Case Study, [Online] 2000, [Retrieved from the Internet on May 9, 2013], <http://delivery.acm.org/10.1145/510000/504879/p549-magyar.pdf> pp. 549-558.*

* cited by examiner

*Primary Examiner* — Thuy Dao
*Assistant Examiner* — Ravi K Sinha
(74) *Attorney, Agent, or Firm* — Fitzpatrick, Cella, Harper & Scinto

(57) ABSTRACT

A plurality of pieces of update information each of which describes modification details from an immediately preceding version for a plurality of updates made for same software are analyzed. Information to be informed and that not to be informed are determined from all the modification details described in the plurality of pieces of update information, and the information to be informed is informed. For example, modification details associated with an issue, which occurred and was fixed in the middle of the plurality of updates, can be determined as the information not to be informed.

7 Claims, 8 Drawing Sheets

| | 601 | 602 | 603 | 604 | 605 | 606 | 607 | 608 |
|---|---|---|---|---|---|---|---|---|
| | UPDATED VERSION | PURPOSE OF MODIFICATION | ISSUE OCCURRENCE VERSION | FUNCTION ID | MODIFICA- TION/ REMOVAL | INFORMING | FUNCTION ID FIRST IMPLEMENTING VERSION | MODIFICATION DETAILS |
| a { | 5.1 | FUNCTION MODIFIED | | FuncIDRedEye | MODIFIED | NORMAL | 5.1 | ADDED RED-EYE CORRECTION FUNCTION OF STILL PICTURE |
| b { | 5.2 | ISSUE FIXED | 4.1 | | | | | FIXED CRASH BUG UPON PLAYING BACK 500-MB MOVIE |
| | 5.2 | FUNCTION MODIFIED | | FuncIDSlideShow | MODIFIED | NORMAL | 5.2 | ADDED SLIDESHOW FUNCTION OF STILL PICTURES |
| c { | 5.3 | ISSUE FIXED | 5.2 | | | | | FIXED CRASH BUG UPON PRINTING 50 IMAGES SIMULTANEOUSLY |
| | 5.3 | FUNCTION MODIFIED | | FuncIDRedEye | MODIFIED | REQUIRED | 5.1 | ENABLED FULL AUTOMATIC CORRECTION IN RED-EYE CORRECTION FUNCTION OF STILL PICTURE |
| | 5.3 | FUNCTION MODIFIED | | FuncIDSlideShow | MODIFIED | NORMAL | 5.2 | ENABLED DISPLAY OF SLIDESHOW OF STILL PICTURES AND MOVIES |
| d { | 5.4 | FUNCTION MODIFIED | | FuncIDRedEye | MODIFIED | NORMAL | 5.1 | ENABLED FULL AUTOMATIC RED-EYE CORRECTION FUNCTION OF MOVIE |
| e { | 5.5 | FUNCTION MODIFIED | | FuncIDRedEye | REMOVED | NORMAL | 5.1 | REMOVED RED-EYE CORRECTION FUNCTION |
| | 5.5 | FUNCTION MODIFIED | | FuncIDIndexPrint | MODIFIED | NORMAL | 5.5 | ENABLED INDEX PRINTING |

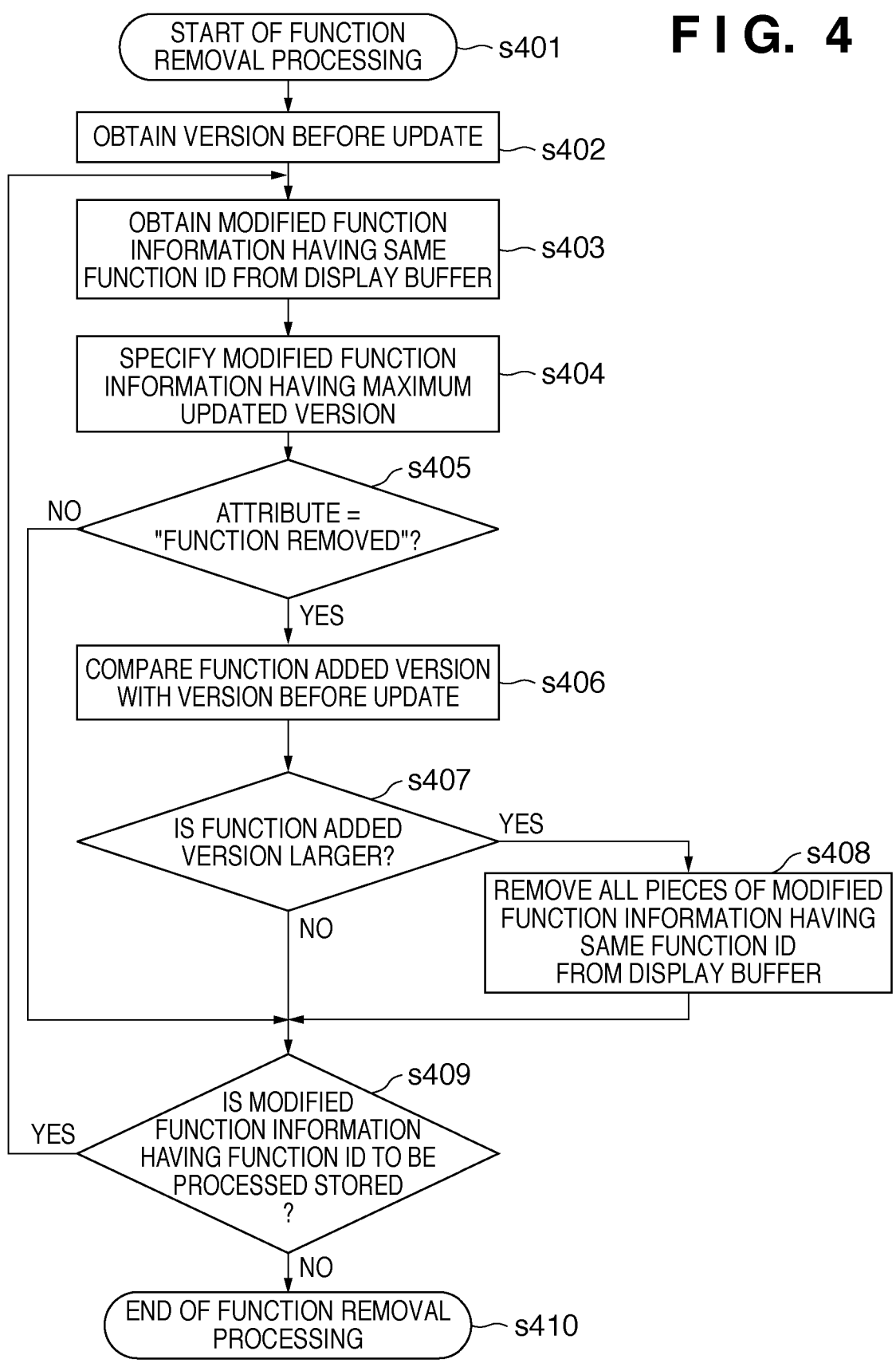

FIG. 5A

```
[RELEASE NOTES OF APPLICATION X VER. 5.5]

MODIFICATION LIST FROM VER. 5.0 TO VER. 5.5

703 — · FIXED CRASH BUG UPON PLAYING BACK 500-MB MOVIE
       · THIS BUG OCCURRED SINCE VER. 4.1
706 — · ENABLED DISPLAY OF SLIDESHOW OF STILL PICTURES AND MOVIES
709 — · ADDED INDEX PRINT FUNCTION

DISPLAY ALL MODIFICATIONS
```
501

FIG. 5B

```
[RELEASE NOTES OF APPLICATION X VER. 5.4]

MODIFICATION LIST FROM VER. 5.1 TO VER. 5.4

703 — · FIXED CRASH BUG UPON PLAYING BACK 500-MB MOVIE
       · THIS BUG OCCURRED SINCE VER. 4.1
705 — ·ENABLED FULL AUTOMATIC CORRECTION
       IN RED-EYE CORRECTION FUNCTION OF STILL PICTURE
706 — · ENABLED DISPLAY OF SLIDESHOW OF STILL PICTURES AND MOVIES
707 — · ENABLED FULL AUTOMATIC RED-EYE CORRECTION FUNCTION
       OF MOVIE
                                    DISPLAY ALL MODIFICATIONS
```
501

FIG. 6

| | 601 | 602 | 603 | 604 | 605 | 606 | 607 | 608 |
|---|---|---|---|---|---|---|---|---|
| | UPDATED VERSION | PURPOSE OF MODIFICATION | ISSUE OCCURRENCE VERSION | FUNCTION ID | MODIFICA-TION/REMOVAL | INFORMING | FUNCTION ID FIRST IMPLEMENTING VERSION | MODIFICATION DETAILS |
| a | 5.1 | FUNCTION MODIFIED | | FuncIDRedEye | MODIFIED | NORMAL | 5.1 | ADDED RED-EYE CORRECTION FUNCTION OF STILL PICTURE |
| b | 5.2 | ISSUE FIXED | 4.1 | | | | | FIXED CRASH BUG UPON PLAYING BACK 500-MB MOVIE |
| | 5.2 | FUNCTION MODIFIED | | FuncIDSlideShow | MODIFIED | NORMAL | 5.2 | ADDED SLIDESHOW FUNCTION OF STILL PICTURES |
| | 5.3 | ISSUE FIXED | 5.2 | | | | | FIXED CRASH BUG UPON PRINTING 50 IMAGES SIMULTANEOUSLY |
| c | 5.3 | FUNCTION MODIFIED | | FuncIDRedEye | MODIFIED | REQUIRED | 5.1 | ENABLED FULL AUTOMATIC CORRECTION IN RED-EYE CORRECTION FUNCTION OF STILL PICTURE |
| | 5.3 | FUNCTION MODIFIED | | FuncIDSlideShow | MODIFIED | NORMAL | 5.2 | ENABLED DISPLAY OF SLIDESHOW OF STILL PICTURES AND MOVIES |
| d | 5.4 | FUNCTION MODIFIED | | FuncIDRedEye | MODIFIED | NORMAL | 5.1 | ENABLED FULL AUTOMATIC RED-EYE CORRECTION FUNCTION OF MOVIE |
| e | 5.5 | FUNCTION MODIFIED | | FuncIDRedEye | REMOVED | NORMAL | 5.1 | REMOVED RED-EYE CORRECTION FUNCTION |
| | 5.5 | FUNCTION MODIFIED | | FuncIDIndexPrint | MODIFIED | NORMAL | 5.5 | ENABLED INDEX PRINTING |

FIG. 7A

[RELEASE NOTES OF APPLICATION X VER. 5.5]
MODIFICATION LIST FROM VER. 5.0 TO VER. 5.5

MODIFICATION IN VER. 5.1
701 — · ADDED RED-EYE CORRECTION FUNCTION OF STILL PICTURE

MODIFICATION IN VER. 5.2
702 — · ADDED SLIDESHOW DISPLAY FUNCTION OF STILL PICTURE
703 — · FIXED CRASH BUG UPON PLAYING BACK 500-MB MOVIE
  · THIS BUG OCCURRED SINCE VER. 4.1

MODIFICATION IN VER. 5.3
704 — · FIXED CRASH BUG UPON PRINTING 50 IMAGES SIMULTANEOUSLY
  · THIS ISSUE OCCURRED SINCE VER. 5.2
705 — · ENABLED FULL AUTOMATIC CORRECTION IN RED-EYE
  CORRECTION FUNCTION OF STILL PICTURE
706 — · ENABLED DISPLAY OF SLIDESHOW OF STILL PICTURES AND MOVIES

MODIFICATION IN VER. 5.4
707 — · ENABLED FULL AUTOMATIC RED-EYE CORRECTION FUNCTIONOF MOVIE

MODIFICATION IN VER. 5.5
708 — · REMOVED RED-EYE CORRECTION FUNCTION
709 — · ADDED INDEX PRINT FUNCTION

FIG. 7B

[RELEASE NOTES OF APPLICATION X VER. 5.4]
MODIFICATION LIST FROM VER. 5.1 TO VER. 5.4

MODIFICATION IN VER. 5.2
702 — · ADDED SLIDESHOW DISPLAY FUNCTION OF STILL PICTURE
703 — · FIXED CRASH BUG UPON PLAYING BACK 500-MB MOVIE
  · THIS BUG OCCURRED SINCE VER. 4.1

MODIFICATION IN VER. 5.3
704 — · FIXED CRASH BUG UPON PRINTING 50 IMAGES SIMULTANEOUSLY
  · THIS ISSUE OCCURRED SINCE VER. 5.2
705 — · ENABLED FULL AUTOMATIC CORRECTION IN RED-EYE
  CORRECTION FUNCTION OF STILL PICTURE
706 — · ENABLED DISPLAY OF SLIDESHOW OF STILL PICTURES AND MOVIES

MODIFICATION IN VER. 5.4
707 — · ENABLED FULL AUTOMATIC RED-EYE CORRECTION FUNCTIONOF MOVIE

FIG. 8A

| APPLICATION NAME | INSTALLED VERSION |
|---|---|
| APPLICATION X | 5.0 |

FIG. 8B

| APPLICATION NAME | INSTALLABLE VERSION |
|---|---|
| APPLICATION X | 5.5 |

FIG. 8C

| APPLICATION NAME | INSTALLED VERSION |
|---|---|
| APPLICATION X | 5.1 |

FIG. 8D

| APPLICATION NAME | INSTALLABLE VERSION |
|---|---|
| APPLICATION X | 5.4 |

INFORMATION PROCESSING APPARATUS FOR EFFICIENTLY INFORMING INFORMATION ASSOCIATED WITH UPDATE DETAILS OF SOFTWARE AND CONTROL METHOD THEREOF

BACKGROUND OF THE INVENTION

1. Field of the Invention

The present invention relates to an information processing apparatus and a control method thereof and, more particularly, to an information processing apparatus for efficiently informing information associated with update details of software and a control method thereof.

2. Description of the Related Art

It is a common practice for each software developer to distribute software of the latest version to users via the Internet. That is, when the version of software installed in a user's PC becomes no longer the latest version, the software developer supplies software of the latest version to the user via the Internet in response to a request from the user. Upon supplying software of the latest version, the software developer also informs the user of modifications from the immediately preceding version. More specifically, the software developer supplies document data called release notes as a list of modifications from functions before update to those after update. The user displays the supplied document data of the release notes on his or her PC.

Japanese Patent Laid-Open No. 2008-165418 describes that when new version of data is registered, a document management server informs a user, who is registered as an informing destination associated with an older version of the data, that the new version has been registered. Thus, according to Japanese Patent Laid-Open No. 2008-165418, the user can be avoided from receiving information about revisions of data which are not related to his or her work.

Note that Japanese Patent Laid-Open No. 2008-165418 does not have any description about information to be provided to the user when a plurality of updates have been made for predetermined software.

On the other hand, when a plurality of updates have been made for predetermined software, release notes normally describe modifications from the immediately preceding update for each update. For this reason, the release notes include many pieces of information of modifications in the plurality of updates. However, few users require information associated with modifications in all updates. Especially, information in an older update is not normally required. In particular, when the release notes include many pieces of information that are not needed for the users, efforts required for the users to recognize needed information from the release notes are increased. That is, efficiency upon providing information associated with a plurality of update details for software to users drops.

When a plurality of updates have been made, release notes that describe all modifications in respective updates are as shown in, for example, FIG. 7A. FIG. 7A shows an example of release notes when predetermined software (application X) of version 5.0 has undergone five updates from version 5.1 to version 5.5, and the release notes include respective update details (modifications) 701 to 709. The release notes are likely to include information which is not needed for users. For example, when an issue that occurred in an intermediate update (version 5.2 in this case) was fixed in a later update (version 5.3 in this case), as denoted by reference numeral 704 in FIG. 7A, users who use the versions (version 5.3 or later) after fixing are unlikely to require information associated with that issue. In this way, as for issues and modifications, which occurred in a certain update and were solved in a later update, in a plurality of updates, the users do not want to know about mere existence of such issues. Therefore, the necessity of the modification 704 included in the release notes is low.

A modification 706 imparts that display of slideshows of both still pictures and movies was enabled in a slideshow function. For this reason, the necessity of a modification 702 (display of a slideshow of only still pictures was enabled) associated with the slideshow function in an older update is also low. That is, when a specific function was modified a plurality of times in updates, it often suffices to inform a final modification without informing intermediate modification details.

A modification 708 imparts that a red-eye correction function was finally removed. Therefore, the necessity to inform modifications associated with the red-eye correction function in older updates (modifications 701, 705, and 707 in the example of FIG. 7A) is also low. Furthermore, since version 5.0 before the first update did not include any red-eye correction function, the necessity to display the modification 708 which informs that the red-eye correction function was removed is originally low.

SUMMARY OF THE INVENTION

Therefore, there are necessities for an information processing apparatus which can efficiently provide information associated with update details when a plurality of updates have been made for same software at a time, and a control method thereof.

According to an aspect of the present invention, there is provided an information processing apparatus comprising: a storage unit adapted to, when a plurality of updates are made for same software at a time, store a plurality of pieces of update information for each update, each of the update information describes modification details from an immediately preceding update; a generation unit adapted to determine detail(s) not to be included in difference information that describes modification details of the software before and after the plurality of updates, from all modification details described in the plurality of pieces of update information by analyzing the plurality of pieces of update information, and generate the difference information based on the determination result; and a display control unit adapted to control a display device to display the difference information generated by the generation unit.

According to another aspect of the present invention, there is provided a control method of an information processing apparatus having a storage unit adapted to, when a plurality of updates are made for same software at a time, store a plurality of pieces of update information each of which describes modification details from an immediately preceding version in each update, the method comprising: a generation step of determining detail(s) not to be included in difference information that describes modification details of the software before and after the plurality of updates, from all modification details described in the plurality of pieces of update information by analyzing the plurality of pieces of update information, and to generate the difference information based on the determination result; and a display control step of controlling a display device to display the difference information generated in the generation step.

According to further aspect of the present invention, there is provided a computer readable recording medium recording an information processing program, the program causes a computer functions as: a storage unit adapted to, when a plurality of updates are made for same software at a time, store a plurality of pieces of update information for each update, each of the update information describes modification details from an immediately preceding update; a generation unit adapted to determine detail(s) not to be included in difference information that describes modification details of the software before and after the plurality of updates, from all modification details described in the plurality of pieces of update information by analyzing the plurality of pieces of update information, and generate the difference information based on the determination result; and a display control unit adapted to control a display device to display the difference information generated by the generation unit.

Further features of the present invention will become apparent from the following description of exemplary embodiments with reference to the attached drawings.

BRIEF DESCRIPTION OF THE DRAWINGS

FIG. 4 is a flowchart for explaining function removal processing in the information processing apparatus according to the embodiment of the present invention;

FIGS. 5A and 5B are views showing screen examples used to display difference information in the information processing apparatus according to the embodiment of the present invention;

FIG. 6 is a view showing an example of release notes to be informed by the information processing apparatus according to the embodiment of the present invention;

FIGS. 7A and 7B are views showing examples of release notes including all pieces of information of modifications; and FIGS. 8A to 8D are views showing examples of management files used by the information processing apparatus according to the embodiment of the present invention.

DESCRIPTION OF THE EMBODIMENTS

Preferred embodiments of the present invention will now be described in detail in accordance with the accompanying drawings.

Figure 1:
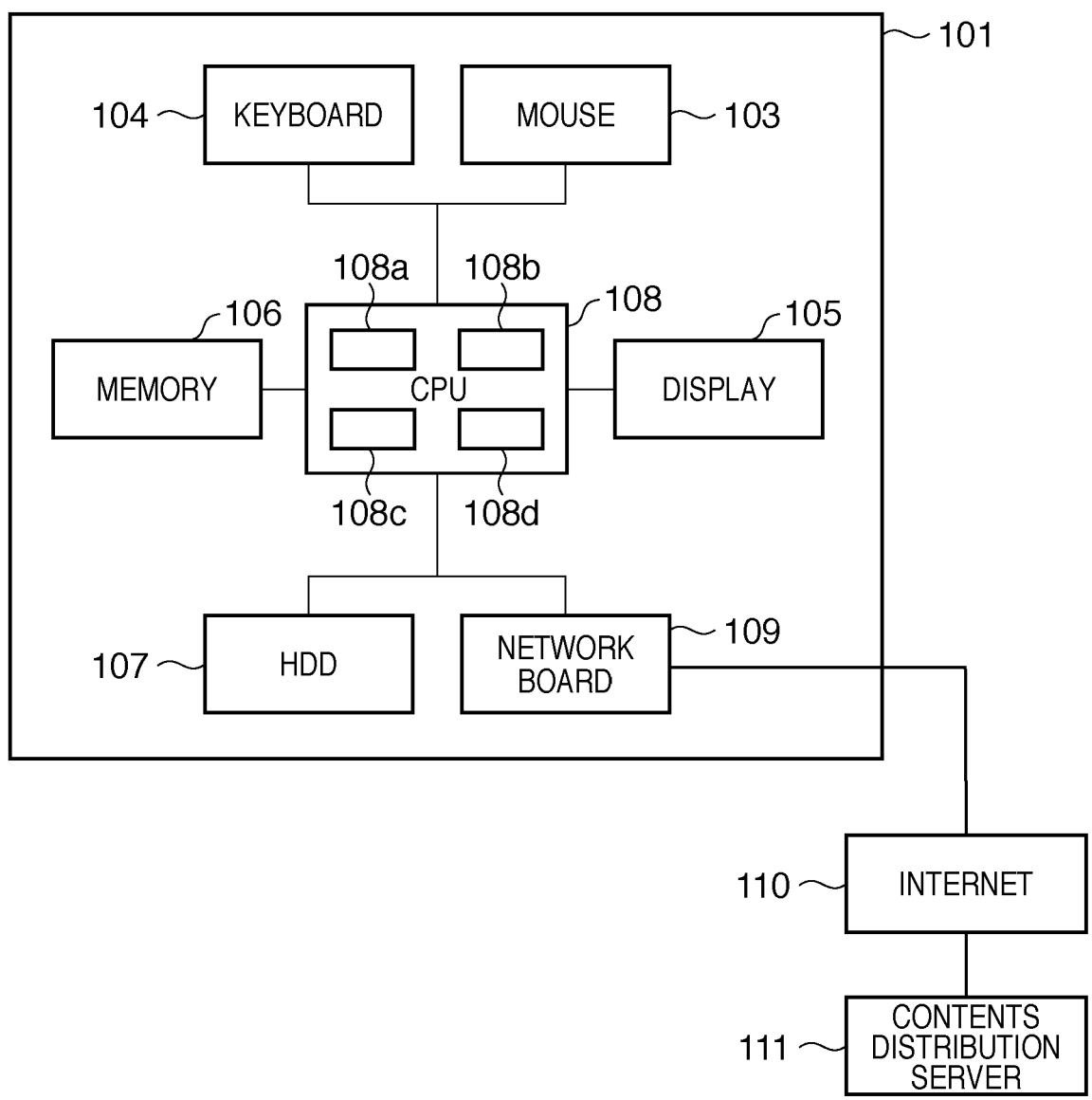
FIG. 1 is a block diagram showing an example of the arrangement of a modification display apparatus as an example of an information processing apparatus according to an embodiment of the present invention.

FIG. 1 is a block diagram showing an example of the arrangement of a modification display apparatus 101 as an example of an information processing apparatus according to an embodiment of the present invention. The modification display apparatus 101 can be implemented by installing software that implements functions to be described later in a general-purpose computer device having, for example, an arrangement connectable to the Internet. Note that the computer devices include all devices that allow to update their software online such as a so-called personal computer, a portable information terminal such as a mobile phone, and digital devices having an Internet communication functions (a digital camera, printer, facsimile, television receiver, etc.). Also, the present invention can be applied to devices which update their software offline using recording media such as a CD-ROM or DVD-ROM. Referring to FIG. 1, a CPU 108 is a central processing unit which totally controls respective units in the modification display apparatus 101, and serves as a main body that executes various kinds of information processing. Functions proposed by this embodiment can be implemented when this CPU 108 controls devices included in the modification display apparatus 101.

A memory 106 allows read and write accesses, and is mainly used as a work area and data buffer of the CPU 108.

The modification display apparatus 101 includes an HDD 107 as a hard disk drive used as a storage device. The HDD 107 stores programs and data. The CPU 108 controls respective units in the modification display apparatus 101 to operate according to programs read out from the HDD 107, and processes data recorded in the HDD 107 according to the programs. The CPU 108 can also record the processed data in the HDD 107. Note that the HDD 107 also records an installed application management file shown in FIG. 8A. The installed application management file describes a name of an application installed in the HDD 107 and the version number (identifier) of that application.

The CPU 108 includes an analysis unit 108a, determination unit 108b, generation unit 108c, and display control unit 108d. The analysis unit 108a, determination unit 108b, generation unit 108c, and display control unit 108d are respectively function modules which are implemented when the CPU 108 loads programs. Note that the analysis unit 108a, determination unit 108b, and generation unit 108c may be included in a single function module. The analysis unit 108a, determination unit 108b, generation unit 108c, and display control unit 108d may be included in the modification display apparatus 101 as circuits independent of the CPU 108. The analysis unit 108a, determination unit 108b, and generation unit 108c may be included in a single generation circuit (generation unit).

A display 105 includes, for example, a CRT, and displays characters such as alphabets and numerals and images such as graphics based on instructions from the CPU 108. A keyboard 104 is an input device, which is operated by the user of the modification display apparatus 101 to input various data and information such as commands. A mouse 103 is an example of a pointing device, and is an interface used by the user to operate programs displayed on the display 105.

A network board 109 is connected to a contents distribution server 111 via an Internet 110. The network board 109 is a transmission/reception unit (communication interface) used to communicate with the contents (application) distribution server 111 via the Internet 110. The modification display apparatus 101 obtains an installable application management file (FIG. 8B) and release notes that describe modifications in respective versions (FIG. 6) from the contents distribution server 111 via the Internet 110. The obtained files are saved in the HDD 107.

The modification display apparatus 101 compares the version of the application described in the installed application management file (FIG. 8A) saved in the HDD 107 with that of the application described in the installable application management file (FIG. 8B) obtained from the contents distribution server 111. In this embodiment, the version comparison is made for the single application. When the version described in the installable application management file shown in FIG. 8B is newer (it has a larger number), the modification display apparatus 101 understands that an update installer used to update that application is available. Then, the modification display apparatus 101 obtains release notes, which describe modifications of updates and have the structure shown in FIG. 6, from the contents distribution server 111. That is, the modification display apparatus 101 obtains the release notes which include pieces of information of modifications in all updates made between the versions of the application shown in FIGS. 8A and 8B, and have a unique structure upon updating the application from the version shown in FIG. 8A to that shown in FIG. 8B.

For example, the installed application management file associates unique information (for example, a name) of the application with the installed version number, and describes that application X of version 5.0 has already been installed in the example of FIG. 8A. The installable application management file associates unique information of the application with the installable latest version number, and describes that the installable version number of application X is 5.5 in the example of FIG. 8B. For this reason, the modification display apparatus 101 obtains release notes a to e shown in FIG. 6 as information (update information) associated with update details in respective updates made for the installed version of application (software) X. The release note a in FIG. 6 describes a modification from version 5.0 to version 5.1. The release notes b in FIG. 6 describe modifications from version 5.1 to version 5.2 The release notes c in FIG. 6 describe modifications from version 5.2 to version 5.3. The release note d in FIG. 6 describes a modification from version 5.3 to version 5.4. The release notes e in FIG. 6 describe modifications from version 5.4 to version 5.5. The modification display apparatus 101 obtains the release notes a to e in FIG. 6 as those to be analyzed. Note that the release notes shown in FIG. 6 may include attributes and identifiers required to inform details suited to the user in addition to the versions after modifications and modification details.

In the release notes a to e shown in FIG. 6, identifiers used to identify versions after modifications in respective updates are associated with modification details from each immediately preceding version. The release notes a to e shown in FIG. 6 include pieces of information which further associate function identifiers used to identify functions in software with the identifiers and modification details in a plurality of updates. The release notes a to e shown in FIG. 6 have, for example, the following data structure.

An updated version field 601 describes identifiers of versions after modifications in respective updates. The updated version field 601 describes, for example, updated version numbers.

A purpose of modification field 602 describes pieces of information used to identify types of purposes of modification. The purpose of modification field 602 describes, for example, "function modified" when the modification is that of a specific function, and "issue fixed" when the modification is to fix an issue.

An issue occurrence version field 603 describes information used to identify a version that lead to an issue in application X. The issue occurrence version field 603 is valid, for example, when the purpose of modification field 602 describes "issue fixed". For example, when the purpose of modification field 602 describes "issue fixed", the issue occurrence version field 603 describes a version number that lead to the fixed issue first.

A function ID field 604 describes identifiers (function IDs) of functions in application X. The function ID field 604 is valid, for example, when the purpose of modification field 602 describes "function modified". For example, when the purpose of modification field 602 describes "function modified", the function ID field 604 describes a function ID assigned to the modified function. Assume that a plurality of functions to be identified are those which belong to an identical layer level in a hierarchical architecture in application X in principle, but they may be functions which belong to different layer levels having no inclusion relations.

A modification/removal field 605 describes pieces of information used to identify types of modifications (those in the broad sense) in function modifications. The modification/removal field 605 is valid, for example, when the purpose of modification field 602 describes "function modified". The modification/removal field 605 describes "modified" when a modification (that in the narrow sense) was made for a function specified in the function ID field 604, and "removed" when a function specified in the function ID field 604 was removed. Note that the modifications in the broad sense include modification and removal in the narrow sense.

An informing field 606 specifies informing attributes of modifications. The informing field 606 is valid, for example, when the purpose of modification field 602 describes "function modified". For example, when the purpose of modification field 602 describes "function modified", the informing field 606 describes "required" when that modification is required to be informed, and "normal" for other cases.

A function ID first implementing version field 607 describes pieces of information used to identify versions that implemented functions specified in the function ID field 604 first. The function ID first implementing version field 607 is valid, for example, when the purpose of modification field 602 describes "function modified". For example, when the purpose of modification field 602 describes "function modified", the function ID first implementing version field 607 describes a version number that implemented a function specified in the function ID field 604 first.

A modification details field 608 describes modification details to be informed to the user, that is, those from each immediately preceding version.

FIG. 7A shows all modification details displayed if modifications are displayed upon updating software from version 5.0 to version 5.5 based on the release notes a to e shown in FIG. 6. A modification 701 displays description details in the modification details field 608 in the release note a in FIG. 6 intact. Modification 702 and 703 display description details in the modification details field 608 in the release notes b in FIG. 6 intact. Modification 704, 705, and 706 display description details in the modification details field 608 in the release notes c in FIG. 6 intact. A modification 707 displays description details in the modification details field 608 in the release note d in FIG. 6 intact. Modification 708 and 709 display description details in the modification details field 608 in the release notes e in FIG. 6 intact. In this way, by merely enumerating all modifications made in all of the plurality of updates, since display including many pieces of unnecessary information is made, efforts required for the user to recognize necessary information from the release notes are increased. That is, efficiency upon providing information associated with a plurality of update details for software to the user drops.

Figure 2:
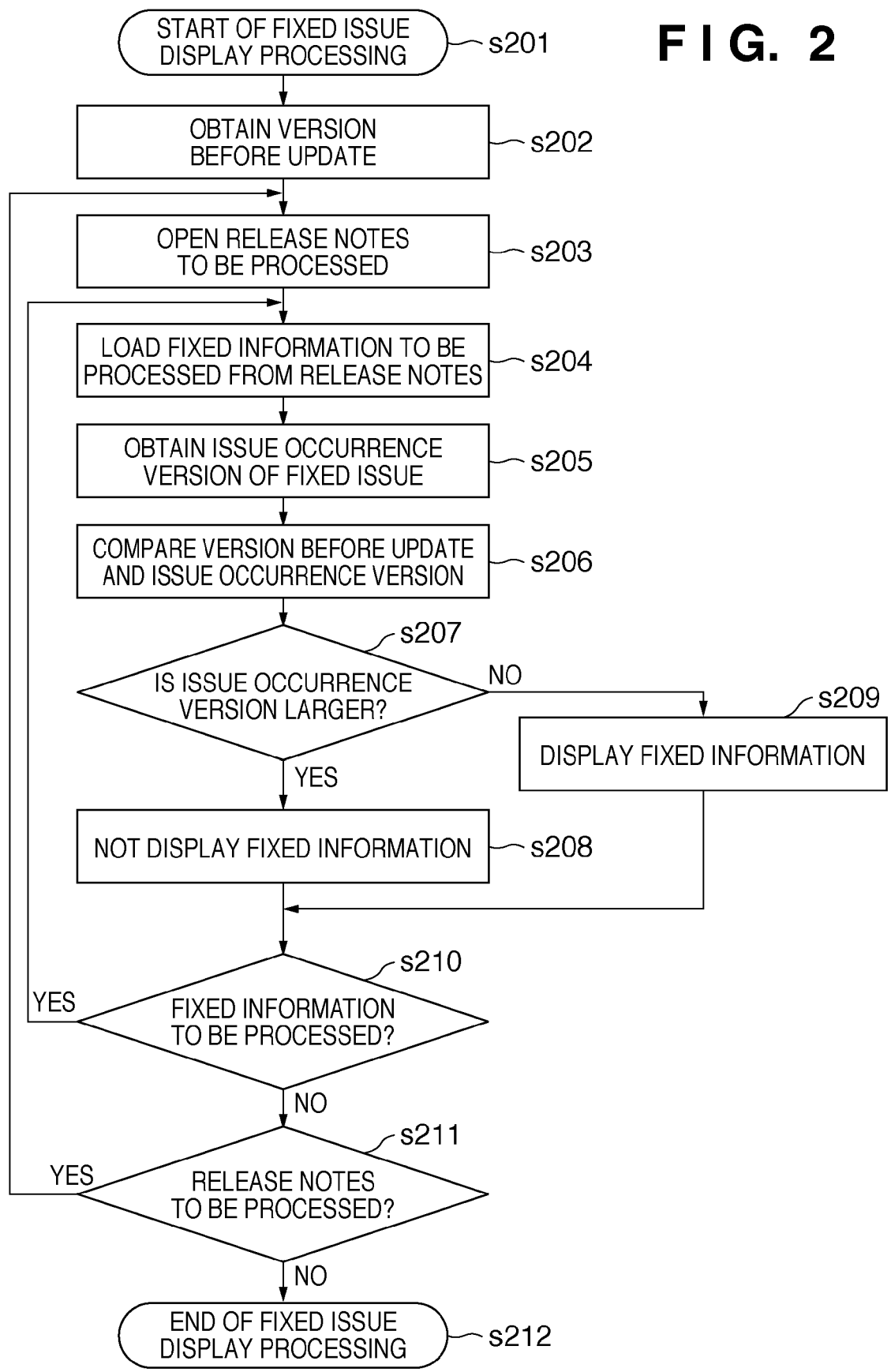
FIG. 2 is a flowchart for explaining fixed issue display processing in the information processing apparatus according to the embodiment of the present invention.
Figure 3:
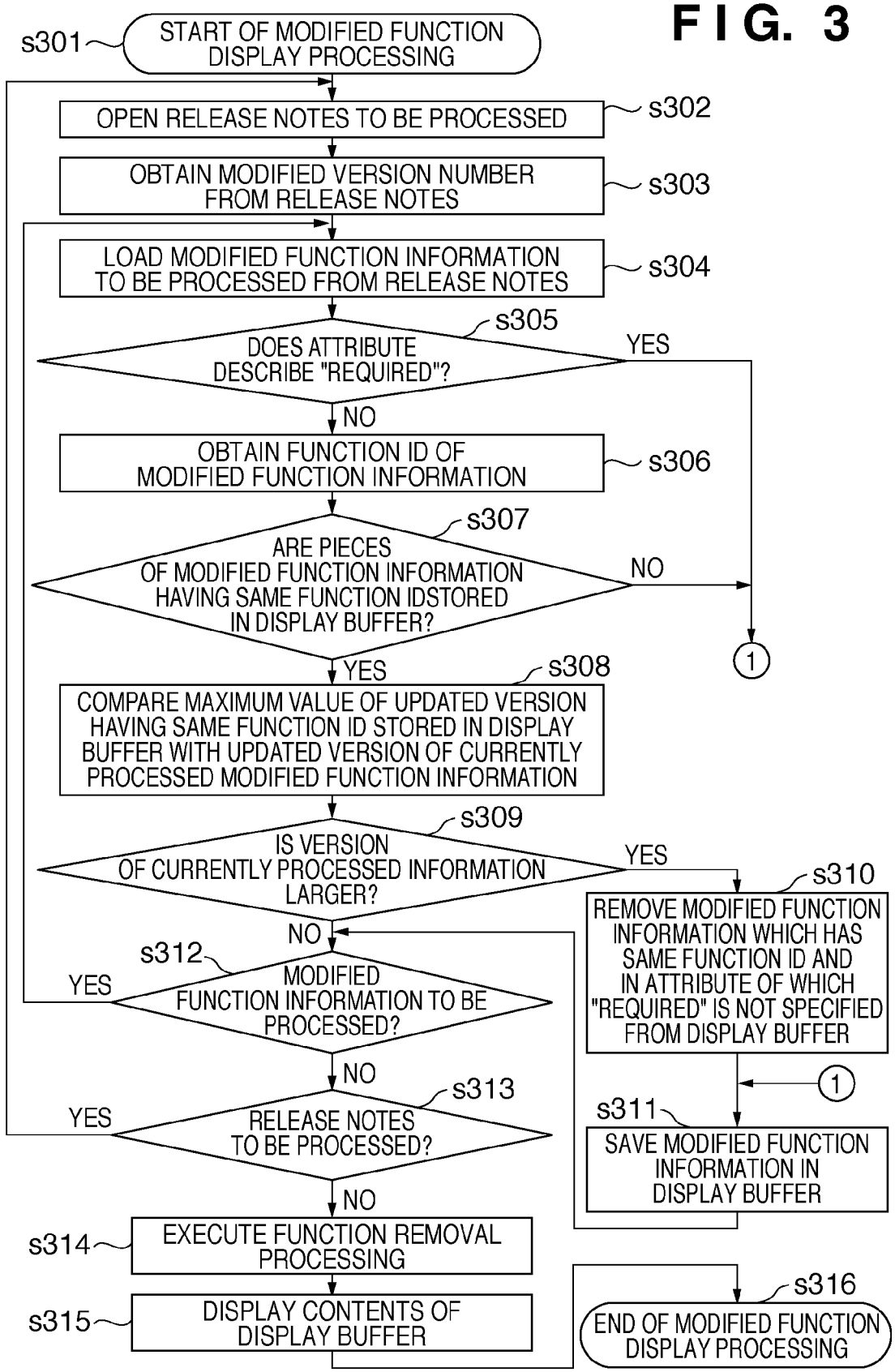
FIG. 3 is a flowchart for explaining modified function display processing in the information processing apparatus according to the embodiment of the present invention.

By contrast, in this embodiment, upon making a plurality of updates at a time, the modification display apparatus 101 extracts only modifications to be informed to the user from all modifications, and informs the user of them using the sequences shown in FIGS. 2, 3, and 4. This embodiment will be described in detail below.

The sequence required not to inform information associated with an issue which occurred in a certain update and was fixed in a later update of a plurality of updates will be described below using FIG. 2. FIG. 2 is a flowchart showing fixed issue display processing.

In step s201, the CPU 108 starts fixed issue display determination processing. In step s202, the CPU 108 accesses the HDD 107, and obtains a version number before update from the installed application management file shown in FIG. 8A.

In step s203, the CPU 108 accesses the HDD 107, and obtains the release notes a to e shown in FIG. 6. Assume that the HDD 107 stores the release notes a to e shown in FIG. 6, which are downloaded in advance from the contents distribution server 111 via the Internet 110 and network board 109.

In step s204, the CPU 108 loads fixed information from the obtained release notes. The CPU 108 can judge based on the description in the purpose of modification field 602 in FIG. 6 whether or not the loaded modification details indicate "issue fixed" or "function modified". If the purpose of modification field 602 describes "issue fixed", the CPU 108 loads the modification details as fixed information. On the other hand, if the purpose of modification field 602 describes "function modified", the CPU 108 may skip that row or may jump the process to step s210.

In step s205, the CPU 108 obtains a version which lead to the fixed issue. That is, the CPU 108 obtains an issue occurrence version number with reference to the issue occurrence version field 603 in FIG. 6. In step s206, the CPU 108 compares the version number (5.0) before update and the issue occurrence version number. The version number before a plurality of updates is obtained in step s202, and the issue occurrence version number is obtained in step s205.

If the CPU 108 determines in step s207 that the issue occurrence version number is larger (YES), it judges that a first modification which fixed an issue that occurred in one of a plurality of updates to be applied in a later update was made. In this case, the CPU 108 advances the process to step s208. On the other hand, if the CPU 108 determines in step s207 that the issue occurrence version number is not larger (NO), it judges that a second modification which fixed an issue that occurred in a version before update was made in the plurality of updates to be applied. In this case, the CPU 108 advances the process to step s209.

In step s208, the CPU 108 determines that the first modification is a modification which is not needed to be provided to the user, and excludes the first modification from difference information. Note that the difference information is information of differences before and after the plurality of updates in modification details for application X, and is information to be informed to the user. In this embodiment, the informing method is attained by a display operation on the display 105. However, the informing method is not limited to the display operation, but it may be attained by an audio output operation or print operation.

In step s209, the CPU 108 determines that the second modification is a modification which is needed to be informed to the user, since the fixed issue occurred in the version before update, and generates difference information to include the second modification.

That is, the CPU 108 analyzes a plurality of pieces of update information. Then, the CPU 108 determines details which are not included in the difference information that describes modification details of software before and after the plurality of updates of all the modification details described in the plurality of pieces of update information, and generates the difference information based on the determination result. More specifically, the analysis unit 108a analyzes the plurality of pieces of update information, and supplies the analysis result to the determination unit 108b. The determination unit 108b determines, according to the analysis result, details which are not included in the difference information that describes modification details of software before and after the plurality of updates of all the modification details described in the plurality of pieces of update information. The determination unit 108b supplies the determined details to the generation unit 108c. The generation unit 108c generates the difference information based on the determined details. The generation unit 108c supplies the generated difference information to the display control unit 108d. The display control unit 108d controls the display 105 to display the received difference information (see FIGS. 5A and 5B).

The CPU 108 checks in step s210 if the release notes which are currently referred to include fixed information which is to undergo determination processing as to whether the information indicates a modification to be informed or that not to be informed. If fixed information to be processed is included (YES), the CPU 108 returns the process to step s204 to execute the determination processing for the fixed information to be processed. If all pieces of fixed information have been processed (NO), the CPU 108 advances the process to step s211.

The CPU 108 checks in step s211 if release notes which are to undergo determination processing as to whether or not to inform fixed information still remain. If release notes to be processed still remain (YES), the CPU 108 returns the process to step s203, and executes the determination processing for the release notes to be processed. If all the release nodes have been processed (NO), the CPU 108 advances the process to step s212, thus ending the fixed issue display processing. With the aforementioned sequence, fixed issues, which are not needed to be informed to the user, are inhibited from being informed, and those that are needed to be informed to the user can be informed. In this way, information that is associated with fixed issues, and is needed for the user can be efficiently provided to the user.

The sequence of processing that informs only a last modification for a single function when modifications for that function have been made in different updates will be described below using FIG. 3. FIG. 3 is a flowchart showing modified function display processing. In a description of this processing, a method of describing a modification for a certain function in a certain update and that for the same function in an update to a later version together will also be described. Furthermore, in the description of this processing, a method of excluding all modifications of a new function, which was added in the middle of a plurality of updates and was removed after the plurality of updates, from difference information will be described later using FIG. 4.

In step s301, the CPU 108 starts modified function display processing. In step s302, the CPU 108 accesses the HDD 107, and obtains a version number before update from the installed application management file shown in FIG. 8A.

In step s303, the CPU 108 accesses the HDD 107, and obtains the release notes a to e shown in FIG. 6. Assume that the HDD 107 stores the release notes a to e shown in FIG. 6, which are downloaded in advance from the contents distribution server 111 via the Internet 110 and network board 109.

In step s304, the CPU 108 loads modified function information to be processed from the obtained release notes. The CPU 108 can judge based on the description in the purpose of modification field 602 in FIG. 6 whether or not the loaded modification details indicate "issue fixed" or "function modified". If the purpose of modification field 602 describes "function modified", the CPU 108 loads the modification details as modified function information. On the other hand, if the purpose of modification field 602 describes "issue fixed", the CPU 108 may skip that row or may jump the process to step s312.

In step s305, the CPU 108 refers to the informing field 606 in FIG. 6 of the loaded modified function information. If the CPU 108 determines that the informing field 606 in FIG. 6 describes "required" (YES), it advances the process to step s311. If the CPU 108 determines that the informing field 606 in FIG. 6 describes "normal" (NO), it advances the process to step s306.

In step s306, the CPU 108 obtains a function ID of the modified function information. The CPU 108 obtains the function ID with reference to the function ID field 604 in FIG. 6.

The CPU 108 confirms in step s307 if pieces of modified function information having the same function ID are stored in a display buffer by accessing the memory 106. Note that the display buffer is an area virtually assured in the memory 106 so as to store information to be displayed on the display 105. If the CPU 108 determines that modified function information having the same function ID is not stored in the display buffer (NO), it advances the process to step s311. If the CPU 108 determines that pieces of modified function information having the same function ID are stored (YES), it advances the process to step s308.

In step s308, the CPU 108 specifies modified function information having a maximum version number (latest version number) in the updated version field 601 of those having the same function ID which are stored in the display buffer, and compares that version number with the updated version number of the currently processed modified function information.

In step s309, the CPU 108 determines the comparison result in step s308. If the CPU 108 determines that the updated version number of the currently processed information is larger, that is, newer than that of the information stored in the display buffer (YES), it advances the process to step s310. If the CPU 108 determines that the updated version number of the currently processed information is not larger, that is, not newer than that of the information stored in the display buffer (NO), it advances the process to step s312.

In step s310, the CPU 108 removes pieces of modified function information having the same function ID, which are stored in the display buffer and in which an informing attribute is not "required", so as to update the modified function information by that having a newer updated version. Note that the CPU 108 does not remove the modified function information having the same function ID if it has an informing attribute "required".

In step s311, the CPU 108 stores the currently processed modified function information in the display buffer. If YES is determined in step s305, the CPU 108 stores the currently processed modified function information in the display buffer irrespective of whether or not the modified function information having already the same function ID is stored in the display buffer. Or if NO is determined in step s307, the CPU 108 stores the currently processed modified function information in the display buffer as new modified information of that function. Or if NO is determined in step s310, the CPU 108 stores the currently processed modified function information in the display buffer so as to update the modified function information by that of a newer updated version.

The CPU 108 checks in step s312 if the release notes which are currently referred to include modified function information which is to undergo determination processing as to whether the information indicates a modification to be informed or that not to be informed. If modified function information to be processed is included (YES), the CPU 108 returns the process to step s304 to execute the determination processing for the modified function information to be processed. If all pieces of modified function information have been processed (NO), the CPU 108 advances the process to step s313.

The CPU 108 checks in step s313 if release notes which are to undergo determination processing as to whether or not to inform modified function information still remain. If release notes to be processed still remain (YES), the CPU 108 returns the process to step s302, and executes the determination processing for the release notes to be processed. If all the release nodes have been processed (NO), the CPU 108 advances the process to step s314.

That is, by repeating a loop of steps s302 to s313, the CPU 108 generates difference information for each function as follows. That is, the CPU 108 analyzes update information for each function in software to generate difference information for each function in software. When modifications for one function were made in a plurality of updates, the CPU 108 generates the difference information to include modification details in the latest one of the plurality of updates. The CPU 108 generates the difference information to exclude modification details in the remaining ones of the plurality of updates. With this sequence, a modified function which is not needed to be informed to the user is inhibited from being informed, and a modified function which is needed to be displayed for the user can be informed. In this manner, information required for the user in association with each modified function can be efficiently provided to the user.

In step s314, the CPU 108 executes function removal processing. The function removal processing will be described in detail below using FIG. 4.

In step s401, the CPU 108 starts the function removal processing. In step s402, the CPU 108 accesses the HDD 107, and obtains a version number before update from the installed application management file shown in FIG. 8A.

In step s403, the CPU 108 accesses the memory 106, and obtains all pieces of modified function information having the same function ID from the display buffer.

In step s404, the CPU 108 specifies modified function information having a maximum version number (latest version number) in the updated version field 601 from those having the same function ID.

In step s405, the CPU 108 refers to the modification/removal field 605 of the (latest) modified function information having the maximum value specified in step s404, and determines whether that value is "modified" or "removed". If the CPU 108 determines that the modification/removal attribute of the latest modified function information is "removed" (function removed) (YES), it advances the process to step s406. If the CPU 108 determines that the modification/removal attribute of the latest modified function information is not "removed" (NO), it jumps the process to step s409.

In step s406, the CPU 108 refers to the function ID first implementing version field 607 in association with the same function ID as that of the modified function information having the maximum value specified in step s404 to obtain a function added version number. Then, the CPU 108 compares the function added version number and the version number before update obtained in step s402.

In step s407, the CPU 108 determines the comparison result in step s406. If the CPU 108 determines that the function added version number is larger (YES), it judges that the function to be determined was added in the middle of the plurality of updates. In this case, the CPU 108 advances the process to step s408. On the other hand, if the CPU 108 determines that the function added version number is not larger (NO), it judges that the function to be determined was added before the plurality of updates. In this case, the CPU 108 advances the process to step s409.

In step s408, the CPU 108 removes, from the display buffer, pieces of the modified function information in which an informing attribute is not "required" of all the pieces of modified function information which have the same function ID as that of the function to be determined. Note that the CPU 108 does not remove the modified function information having the same function ID as that of the function to be determined if it has an informing attribute "required".

The CPU 108 checks in step s409 if modified function information having a function ID, which is to undergo determination processing as to whether or not it indicates a modification to be displayed on the display 105 or that not to be displayed is stored in the display buffer. If the CPU 108 determines that modified function information having a function ID to be processed is stored (YES), it returns the process to step s403 to apply the aforementioned processes to the function ID to be processed. If the CPU 108 determines that no modified function information having a function ID to be processed is stored (NO), it advances the process to step s410, thus ending the function removal processing.

That is, by repeating a loop of steps s403 to s409, the CPU 108 generates difference information as follows. That is, when a new function was added in a first update of a plurality of updates, and was removed in a second update, the CPU 108 generates difference information to exclude information about the new function. The second update is later than the first update of the plurality of updates. Then, information associated with a function which was added in the middle of the plurality of updates can be prevented from being included in the difference information. That is, with the aforementioned sequence, an added function which is not needed to be informed to the user is inhibited from being informed, and an added function which is needed to be informed to the user can be informed. As a result, information required for the user in association with the added function can be efficiently provided to the user.

In step s315 in FIG. 3, the CPU 108 supplies the contents (difference information) of the display buffer to the display 105. The display 105 displays the contents (difference information) of the display buffer (see FIGS. 5A and 5B).

In step s316, the CPU 108 ends the modified function display processing. With the aforementioned sequence, modified function information which is not needed to be informed to the user is not informed, and modified function information which is needed to be informed to the user can be informed.

The display contents in FIG. 7A can be sorted out using the aforementioned sequence, as shown in FIG. 5A. Note that the sorted-out display contents include an all modification display menu 501 for a user who wants to confirm all modifications made in the middle of updates. That is, the CPU 108 generates not only the difference information used to make the display shown in FIG. 5A but also information of all modifications used to make the display shown in FIG. 7A, and stores these pieces of information in the display buffer. Then, upon detection of this all modification display menu 501 clicked by the mouse 103, the CPU 108 supplies the information of all the modifications to the display 105. The display 105 can switch the display shown in FIG. 5A to that shown in FIG. 7A accordingly. As a result, not only the latest modified function information is displayed, but also all the modifications made in the middle of updates can be informed in response to a request from a user who wants to confirm them.

Note that FIG. 5A only displays the latest modified function information in FIG. 7A, without displaying pieces of intermediate modified function information. Hence, a display example of pieces of intermediate modified function information will be described below. Using the same release notes shown in FIG. 6, when a version before update is obtained from an installed application management file shown in FIG. 8C, and an updatable version is obtained form an installable application management file shown in FIG. 8D, it can be detected that software can be updated from version 5.1 to version 5.4. In this case, FIG. 7B shows an example of a display if all modifications made during these updates are displayed. When the processing of this embodiment described so far is applied, difference information is displayed, as shown in FIG. 5B. As can be seen from FIG. 5B, both function modifications, that is, a red-eye correction function modified in a modification 707, and that modified in a previous modification 705 are displayed.

In the above-described embodiments, a case in which a plurality of updates are applied to a single software is described. However, the present invention is not limited to such a case. For example, the present invention also encompasses a case in which a plurality of updates are applied to a plurality of application programs constituting a single software at a time. Accordingly, in the attached claims, either a single or plural application(s) may constitute "same software."

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-174741, filed on Jul. 27, 2009, which is hereby incorporated by reference herein its entirety.

What is claimed is:

1. A control method of an information processing apparatus having a storage unit adapted to, when a plurality of updates are made for the same software at a time, store a plurality of pieces of update information for the plurality of updates, each of the pieces of update information describing modification details from an immediately preceding update, the method comprising:

a generation step of determining detail(s) not to be included in difference information that describes modification details of the software before and after the plurality of updates, from all modification details described in the plurality of pieces of update information by analyzing the plurality of pieces of update information, and to generate the difference information based on the determination result; and a display control step of controlling a display device to display the difference information generated in said generation step, wherein, if said generation step determines that a first modification which fixed an issue that occurred in a certain update of the plurality of updates was made in another update of the plurality of updates, said generation step generates the difference information to exclude any details about the first modification, and when said generation step determines that a second modification which fixed an issue that occurred in an update before the plurality of updates have been made in an update of the plurality of updates, said generation step generates the difference information to include detail(s) about the second modification.

2. An information processing apparatus having a processor, comprising:

a storage unit adapted to, when a plurality of updates are made for the same software at a time, store a plurality of pieces of update information for the plurality of updates, each of the pieces of update information describing modification details from an immediately preceding update;

a generation unit adapted to determine detail(s) not to be included in difference information that describes modification details of the software before and after the plurality of updates, from all modification details described in the plurality of pieces of update information by analyzing the plurality of pieces of update information, and generate the difference information based on the determination result; and a display control unit adapted to control a display device to display the difference information generated by said generation unit, wherein, if said generation unit determines that a first modification which fixed an issue that occurred in a certain update of the plurality of updates was made in another update of the plurality of updates, said generation unit generates the difference information to exclude any details about the first modification, and when said generation unit determines that a second modification which fixed an issue that occurred in an update before the plurality of updates have been made in an update of the plurality of updates, said generation unit generates the difference information to include detail(s) about the second modification.

3. The apparatus according to claim 1, wherein if a new function was added to the software and then removed from the software during the plurality of updates, the generation unit generates the difference information to exclude any details about the new function.

4. The apparatus according to claim 1, wherein, in the plurality pieces of the update information, an identifier of each version, the modification details, and a function identifier used to identify a function in the software are associated with each other, and said generation unit generates the difference information for each function in the software by analyzing the plurality pieces of the update information for each function in the software.

5. The apparatus according to claim 4, wherein, if modifications for one function have been made in two or more updates of the plurality of updates, said generation unit generates the difference information for the one function to include modification details only in a latest update of the plurality of updates.

6. The apparatus according to claim 1, wherein said display control unit further controls the display device to display a menu which allows to browse all the pieces of update information together with the difference information.

7. A non-transitory computer-readable recording medium recording an information processing program for causing a computer to function as:

a storage unit adapted to, when a plurality of updates are made for the same software at a time, store a plurality of pieces of update information for the plurality of updates, each of the pieces of update information describing modification details from an immediately preceding update;

a generation unit adapted to determine detail(s) not to be included in difference information that describes modification details of the software before and after the plurality of updates, from all modification details described in the plurality of pieces of update information by analyzing the plurality of pieces of update information, and generate the difference information based on the determination result; and a display control unit adapted to control a display device to display the difference information generated by said generation unit, wherein, if said generation unit determines that a first modification which fixed an issue that occurred in a certain update of the plurality of updates was made in another update of the plurality of updates, said generation unit generates the difference information to exclude any details about the first modification, and when said generation unit determines that a second modification which fixed an issue that occurred in an update before the plurality of updates have been made in an update of the plurality of updates, said generation unit generates the difference information to include detail(s) about the second modification.

* * * * *